(12) United States Patent
Burns et al.

(10) Patent No.: US 7,262,902 B2
(45) Date of Patent: Aug. 28, 2007

(54) HIGH GAIN RESONANT MODULATOR SYSTEM AND METHOD

(75) Inventors: William K. Burns, Alexandria, VA (US); Joelle Prince, Ayer, MA (US); Edward Ackerman, Cambridge, MA (US)

(73) Assignee: Photonic Systems, Inc., Billerica, MA (US)

( * ) Notice: Subject to any disclaimer, the term of this patent is extended or adjusted under 35 U.S.C. 154(b) by 105 days.

(21) Appl. No.: 10/969,616

(22) Filed: Oct. 20, 2004

(65) Prior Publication Data

US 2006/0083456 A1 Apr. 20, 2006

(51) Int. Cl.
G02F 1/00 (2006.01)
G02F 1/03 (2006.01)
G02F 1/035 (2006.01)
G02B 6/02 (2006.01)
G02B 6/42 (2006.01)

(52) U.S. Cl. .............. 359/321; 359/245; 359/237; 359/279; 359/334; 385/2; 385/3; 385/18; 385/31; 385/37; 385/39; 385/50; 385/126; 356/350; 356/461; 372/6; 372/97; 250/227.27

(58) Field of Classification Search ........ 359/237–239, 359/245, 279, 321, 334; 356/461, 345, 350; 372/6, 18, 20, 26, 29, 94; 385/2, 3, 8, 37, 385/39, 43, 50; 250/227.12, 227.19, 227.27; 398/188

See application file for complete search history.

(56) References Cited

U.S. PATENT DOCUMENTS

| | | | |
|---|---|---|---|
| 4,592,043 A | | 5/1986 | Williams |
| 4,658,401 A | * | 4/1987 | Segre et al. .................. 372/26 |
| 4,661,964 A | * | 4/1987 | Haavisto ...................... 372/94 |
| 4,720,160 A | | 1/1988 | Hicks, Jr. |
| 5,018,857 A | * | 5/1991 | Sanders et al. ............. 356/461 |

(Continued)

FOREIGN PATENT DOCUMENTS

WO 2002/08815 A1 1/2002

(Continued)

OTHER PUBLICATIONS

Burns, W.K., et al. "Broad-Band Unamplified Optical Link with RF Gain Using a LiNbO3 Modulator,"IEEE Photonics Technology Letters. 11, No. 12, pp. 1656-1658, Dec. 1999.

(Continued)

Primary Examiner—Loha Ben
(74) Attorney, Agent, or Firm—Houston Eliseeva LLP

(57) ABSTRACT

An optical resonant modulator includes an optical ring resonator and an optical loop that is coupled to the optical ring resonator by two couplers. The optical ring resonator can have a hybrid design in which the ring resonator is formed on an electro-optically passive material and the optical loop is formed on an electro-optically active material. An amplification section can be inserted between the electro-optically passive and the electro-optically active sections. In analog applications, an optical resonator includes a Mach Zehnder interferometer section having an input and an output, with a feedback path coupling the output to the input. Applications of the optical modulator of the invention, and a method for modulating an optical signal also are disclosed.

40 Claims, 14 Drawing Sheets

U.S. PATENT DOCUMENTS

| | | | | |
|---|---|---|---|---|
| 5,241,616 | A | * | 8/1993 | Garcia .......................... 385/126 |
| 5,319,727 | A | * | 6/1994 | Ford et al. ..................... 385/30 |
| 5,398,111 | A | * | 3/1995 | Cardarelli .................. 356/461 |
| 5,615,037 | A | | 3/1997 | Betts et al. |
| 6,052,495 | A | * | 4/2000 | Little et al. ..................... 385/2 |
| 6,633,696 | B1 | | 10/2003 | Vahala et al. |
| 6,668,006 | B1 | * | 12/2003 | Margalit et al. .............. 372/97 |
| 7,050,212 | B2 | * | 5/2006 | Matsko et al. .............. 359/245 |
| 7,062,131 | B2 | * | 6/2006 | Ilchenko ...................... 385/50 |
| 2001/0004411 | A1 | | 6/2001 | Yariv |

FOREIGN PATENT DOCUMENTS

| | | |
|---|---|---|
| WO | 2002/097526 A2 | 12/2002 |
| WO | 2003/038490 A1 | 5/2003 |

OTHER PUBLICATIONS

Choi, J.M., et al, "Control of Critical Coupling in a Ring Resonator-Fiber Configuration: Application to Wavelength-Selective Switching, Modulation, Amplification, and Oscillation," Optics Letters, vol. 26, No. 16, pp. 1236-1238, Aug. 15, 2001.

Green, W.M. J., et al., "Control of Optical Waveguide-Resonator Coupling: Applications to Low-Power Optical Modulation and Switching," Paper # MM3, LEOS, pp. 130-131, 2003.

Heebner, J.E., et al., "Optical Transmission Characteristics of Fiber Ring Resonators," IEEE Journal of Quantum Electronics, vol. 40, No. 6, pp. 726-730, Jun. 2004.

Yariv, A., "Critical Coupling and its Control in Optical Waveguide-Ring Resonator Systems," IEEE Photonics Technology Letters vol. 14, No. 4, pp. 483-485, Apr. 2002.

Yariv A., Universal Relations for Coupling of Optical Power Between Microresonators and Dielectric Waveguides, Electronics Letters, vol. 36, No. 4, pp. 321-322, Feb. 17, 2000.

International Search Report from PCT/US2005/037141, filed Oct. 18, 2005.

International Preliminary Report on Patentability form International Application No. PCT/US2005/037141, filed on Oct. 18, 2005.

* cited by examiner

HIGH GAIN RESONANT MODULATOR SYSTEM AND METHOD

GOVERNMENT SUPPORT

The invention was made with government support under Grant/Contract No. F30602-00-C-0128 awarded by Defense Advanced Research Projects Agency (DoD). The government has certain rights in the invention.

BACKGROUND OF THE INVENTION

Mach Zehnder interferometers (MZIs) often are used to modulate the amplitude or intensity of an optical signal. MZIs are most often deployed as modulators in digital links. However, they also have application in analog links, such as in multi- or sub-octave remote antenna links.

Generally, deployed MZI modulators are monolithic devices formed from an electro-optically active material such as lithium niobate. The MZIs have two couplers and two arms. Electrodes are provided for controlling the electric field in the region of the two arms. An input signal is divided between the two arms by a first coupler, with the divided signal passing through the two arms, and then recombined by the second coupler. Often, the arms have equal length and the couplers are 50/50 couplers.

During operation, the relative phase of the divided input signals is controlled by some type of modulation in one or both arms. The intensity of the output signal thus depends on the interference of the divided input signals after recombination. In this type of device a phase difference of $\pi$, between the output signals of the arms of the interferometer, is generally required to change the output intensity from an "on" state to an "off" state, and the associated voltage required for such a change is referred to as $V\pi$.

FIG. 1 shows a variant of the classical MZI design, which combines features of a MZI and a ring resonator. This device and its behavior are described in U.S. Patent Application Publication No. 2001/0004411 A1, filed on Jun. 21, 2001, and in an article by Yariv, A., *Universal Relations for Coupling of Optical Power Between Microresonators and Dielectric Waveguides*, Electronics Lett. Vol. 36, No. 4, p. 321, (2000).

In this resonant modulator device, a balanced MZI was interposed in the path of a waveguide ring resonator 124, using a waveguide cross 130 and 3 dB directional couplers 126, 128 into and from the MZI. The differential phase shift $\Delta\phi$ distributed between arms 120 and 122 is $+\Delta\phi/2$ and $-\Delta\phi/2$, respectively. In a "balanced" (also referred to as "symmetrical" or "push-pull") arrangement, a voltage of $+V/2$ is applied to the electrode associated with one arm and a voltage of $-V/2$ is applied to the electrode associated with the other arm. It has been shown that, for this configuration, a very small (compared to $\pi$) change in the interferometer phase, $\Delta\phi$, can switch the output state from on to off. Likewise the voltage required for on-off operation is very small compared to the traditional $V\pi$ required for a conventional MZI. The conditions that achieve such operation are referred to as "critical coupling".

SUMMARY OF THE INVENTION

Current designs for the resonant modulators, however, suffer from a number of limitations. First, the use of a balanced MZI, with 3 dB directional couplers, has been considered to date for digital applications, and may not be optimized for analog applications. Moreover, the combination of active and passive waveguides in the resonant ring section may make hybrid fabrication less feasible. Finally, the use of a waveguide crossover may also complicate fabrication.

The invention generally is related to a resonant optical modulator and related method for modulating an optical signal. A number of modifications are proposed relative to current designs. These make this general class of devices relevant to applications requiring high link gain for analog applications. Moreover, certain embodiments of the inventive system are better suited for hybrid fabrication.

The optical resonant modulator of the invention includes an optical ring resonator and an optical loop coupled to the ring resonator by two couplers. The optical modulator of the invention includes a MZI section having an input and an output, with a feedback path coupling the output to the input.

In one aspect, the modulator of the invention is a hybrid modulator having an electro-optically passive section that includes a ring resonator and an electro-optically active section that includes an optical loop. The optical loop is coupled to the ring resonator through two couplers. In a further embodiment, an amplification section can be placed between, or even made part of, the electro-optically passive and electro-optically active sections.

The method of the invention includes directing an input optical signal to an optical loop. At least a portion of the input optical signal is diverted to a ring resonator that is coupled to the optical loop through two couplers, thus generating an optical loop signal and a ring resonator signal. A relative phase shift, $\Delta\phi$, is induced between the optical loop signal and the ring resonator signal in response to an input signal, to generate a modulated optical signal.

The optical resonant modulator of the invention can be employed for generating a modulated optical signal in response to a signal from an antenna, in an antenna communications link. The modulated optical signal is transmitted through an optical transmission path.

The optical resonant modulator of the invention is particularly well suited for use as a broadband modulator for high gain analog applications and results in improved slope efficiency for increased analog link gain. It does not require any waveguide crossovers. In one aspect, the invention provides near theoretical performance, independent of intrinsic material losses. The resonator lends itself to hybrid integration so that optimal advantages of different materials can be combined for improved operation. By physically separating the functions of low loss resonance, optical amplification and electro-optic phase shift, the most appropriate materials can be selected and used for each. Achieving low loss is crucial for maximum performance, and amplification of the output of the high-loss sections allows close to ideal performance. In one embodiment, the optical resonant modulator of the invention is expected to provide an absolute link gain of about 20 dB, which is attractive for many radar communications and electronic warfare applications. The optical modulator of the invention can also be used for digital applications.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

In general, for an arbitrary MZI, the total MZI phase shift $\Delta\phi_t$, which is the phase difference between the arms of the interferometer, can be defined as:

$$\Delta\phi_t = \phi_1 - (-\phi_2) = s\Delta\phi_t + (1-s)\Delta\phi_t \quad (1)$$

where $\phi_1$ and $-\phi_2$ are the phase changes in arms 1 and 2, respectively, and s is a parameter describing the asymmetry of the MZI. In general, $0 \leq s \leq 1$. For the arrangement shown in FIG. 1, eq. 1 is satisfied by s=½.

For this arrangement, 3 dB couplers 126 and 128 divide the optical power of a single input in half. Stated in another way, κz is constrained to 45 deg, where κ is the coupling coefficient in the directional coupler and z is its length. It can be shown that these are the only conditions under which critical coupling, where the power output is 0, can be obtained for all values of Δφ, independent of κz.

Figure 2:
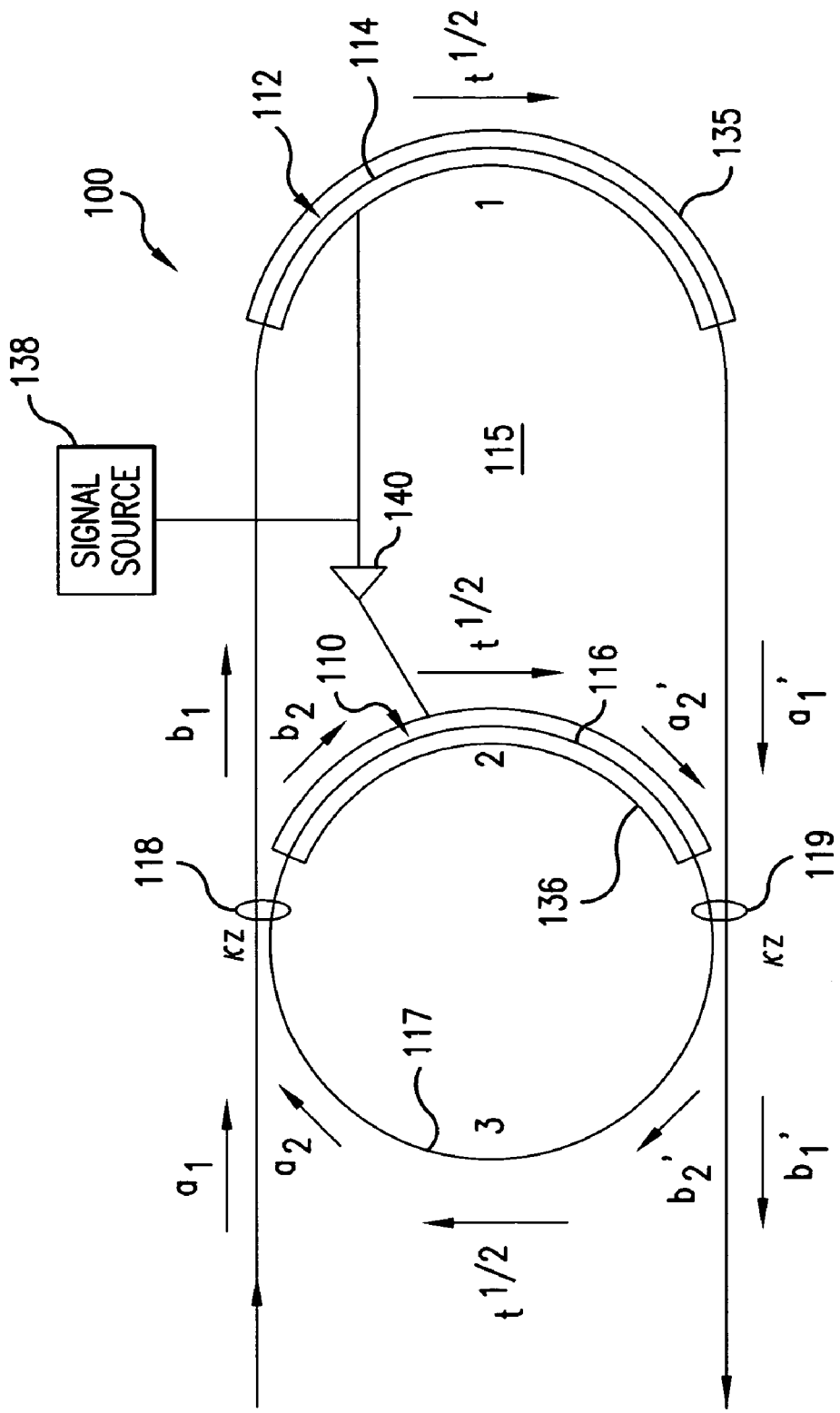
FIG. 2 is a schematic diagram of an optical resonant modulator of the present invention.

FIG. 2 illustrates an optical resonant modulator, which has been constructed according to the principals of the present invention.

The optical resonant modulator 100 includes ring resonator 110 and optical loop 112. Thought of in a different way, the modulator 100 comprises a MZI 115 with an output of amplitude b$_2$' feeding back to its input. The ring resonator 110 is a circulating mode resonator and is usually circular. Although in other implementations other suitable closed shapes are used such as ovals.

In one embodiment, operating at 1550 nanometers (nm), the ring resonator 110 has a diameter in the range of from about 1 centimeter (cm) to about 10 cm. Preferably, ring resonator 110 has a diameter in the range of from about 50 micrometer (μm) to about 10 cm.

Optical loop 112 includes a bent waveguide 114. In a preferred example, the bend is approximately 180 degrees.

The bend 114 functions as an optical delay relative to first segment 116 of the ring 110. The bend 114 is typically implemented as a large radius bend to minimize losses. However, in other implementations, the bend 114 is implemented by reflection at, or near, the end of the chip or by other means known in chip manufacturing.

Ring resonator 110 is coupled to the optical loop 112 by two directional couplers 118 and 119. In a preferred implementation, the couplers 118, 119 have arbitrary values of coupling, with κz having values 0<κz<90 deg. Specifically, they are preferably, identical directional couplers. Nearly identical, slightly or somewhat unequal couplers also can be employed.

Figure 1:
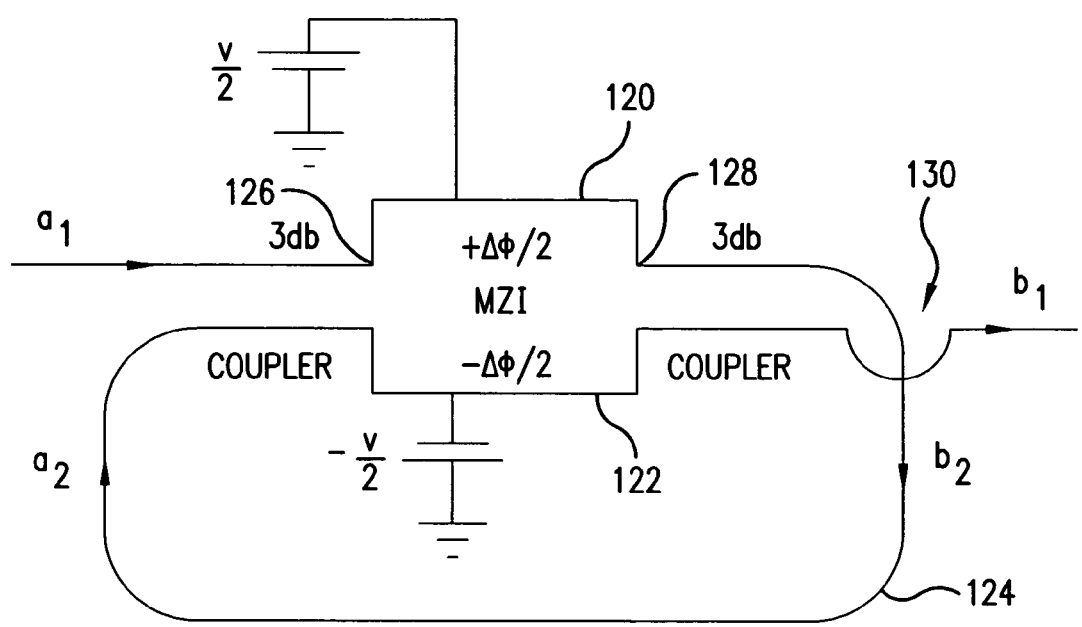
FIG. 1 is a schematic diagram illustrating a prior art resonant modulator.

One advantage of the illustrated embodiment of the present invention is crossover 130, shown in FIG. 1, is no longer necessary in the inventive optical resonant modulator 100.

There are three distinct pathways for propagating optical signals: path #1, along optical loop 112, path #2 along the first segment 116 of ring resonator 110, and path #3 along the second segment 117 of ring resonator 110. Paths #1 and #2 are connected by directional couplers 118 and 119 forming the MZI 115 including the first segment 116 and the bend 114. Path #3 connects part of the output signal of this MZI 115 to its input.

To modulate an optical signal, an input optical signal of amplitude a$_1$ is directed to the first coupler 118. The input signal is distributed between the first segment 116 of the ring resonator 110 and the optical loop 112 by the first directional couplers 118. This yields an optical loop signal and a ring resonator signal.

More specifically, at directional coupler 118, input optical signal a$_1$ and optical signal a$_2$, from path #3, are combined giving rise to optical signals b$_1$ and b$_2$. Optical signal b$_1$ is propagated along path #1 and, after propagation losses and the phase delay of the path #1, enters directional coupler 119 as a$_1$'. Signal b$_2$ is propagated along path #2 and, after propagation losses and the phase delay of the path #2, enters directional coupler 119 as a$_2$'. Directional coupler 119 results in output optical signals b$_1$' and optical signal b$_2$'. b$_2$' is propagated along path #3, where it undergoes propagation losses and the phase delay of the path #3, resulting in optical signal a$_2$.

A relative phase change, Δφ, is induced between the optical loop signal and the ring resonator signal. A preferred manner for changing the refractive index in path #1 with respect to path #2, resulting in a signal phase change between the arms of the MZ interferometer, is use of an electro-optic material and an electrical signal source, e.g., a driving electrode, such as loop electrode 135, located relative to the waveguide of loop 112. In some implementations, ring electrode 136 is optionally placed relative to first segment 116 of ring 110.

In a preferred embodiment, MZI 115 is operated asymmetrically, with the signal phase shift being applied to path #1 only by using loop electrode 135, while ring electrode 136 is unused or absent. The voltage on loop electrode 135 is driven by the signal source 138, resulting in modulation of the optical delay of optical loop 112 relative to the first segment 116 of ring 110. Thus $\Delta\phi=\phi_1$, and s=1 in eq. 1.

In another embodiment, MZI 115 is operated asymmetrically by placing ring electrode 136 relative to the first segment 116 of ring 110, while loop electrode 135 is unused or absent, resulting in the entire signal phase shift being applied to path #2. Then $\Delta\phi_t=\phi_2$, and s=0 in eq. 1. If desired, it is also possible to operate MZI 115 by dividing the entire signal phase shift between paths #1 and #2 in an arbitrary manner, using ring electrode 136 in addition to loop electrode 135. Through inverter 140, the delay of the loop 112 is modulated relative to the delay of the first segment 116 in a push-pull arrangement. $\Delta\phi_t$ is then given by eq. 1, with an arbitrary value of s.

Ring resonator 110 is characterized by a ring amplitude transmission, t, and an amplitude transmission for one-half (½) of the circumference of the ring of $t^{1/2}$. Assuming attenuation to be caused primarily by bend loss in the ring, the monolithic design results in the amplitude transmission being the same for path #1 and path #2. In FIG. 2, and assuming s=1, the output ($b'_1,b'_2$) field amplitudes can be related to the input ($a_1,a_2$) field amplitudes by:

$$\begin{pmatrix} b'_1 \\ b'_2 \end{pmatrix} = t^{\frac{1}{2}} e^{\frac{i\theta}{2}} \begin{pmatrix} a_{11} & a_{12} \\ a_{21} & a_{22} \end{pmatrix} \begin{pmatrix} a_1 \\ a_2 \end{pmatrix} \quad 2a$$

where $\theta$ is the loop phase change in one transit of the ring, and $a_{ii}$ are matrix elements of the matrix a.

Using this formulism, the optical power output is given by:

$$\frac{P_{out}}{P_{in}} = \left|\frac{b'_1}{a_1}\right|^2 = t \frac{(t^2 - 2|a_{11}|t\cos(\theta - \phi_{11} + \Delta\phi) + |a_{11}|^2)}{(t^2|a_{22}|^2 - 2t|a_{22}|\cos(\theta + \phi_{22}) + 1)} \quad 2b$$

where $|a_{11}|$ and $\phi_{11}$ are the magnitude and phase of $a_{11}$, etc.

The solution for critical coupling, where $P_{out}=0$ at a phase shift $\Delta\phi_c$, occurs when $$\cos(\theta-\phi_{11}+\Delta\phi_c)=1 \quad 3a$$

and from eq. 2b:

$$t=|a_{11}| \quad 3b$$

Equation 3a defines the resonance condition for loop phase change $\theta$ around the ring, where $\phi_{11}$ is a function of t and $\kappa z$. In contrast to the prior art arrangement, the critical coupling solution for $\Delta\phi_c$ is now a function of both loop transmission (t), coupling in the directional couplers ($\kappa z$), and the loop phase change $\kappa$ which satisfies the simultaneous solution of eqs. 3a and 3b.

Figure 3A:
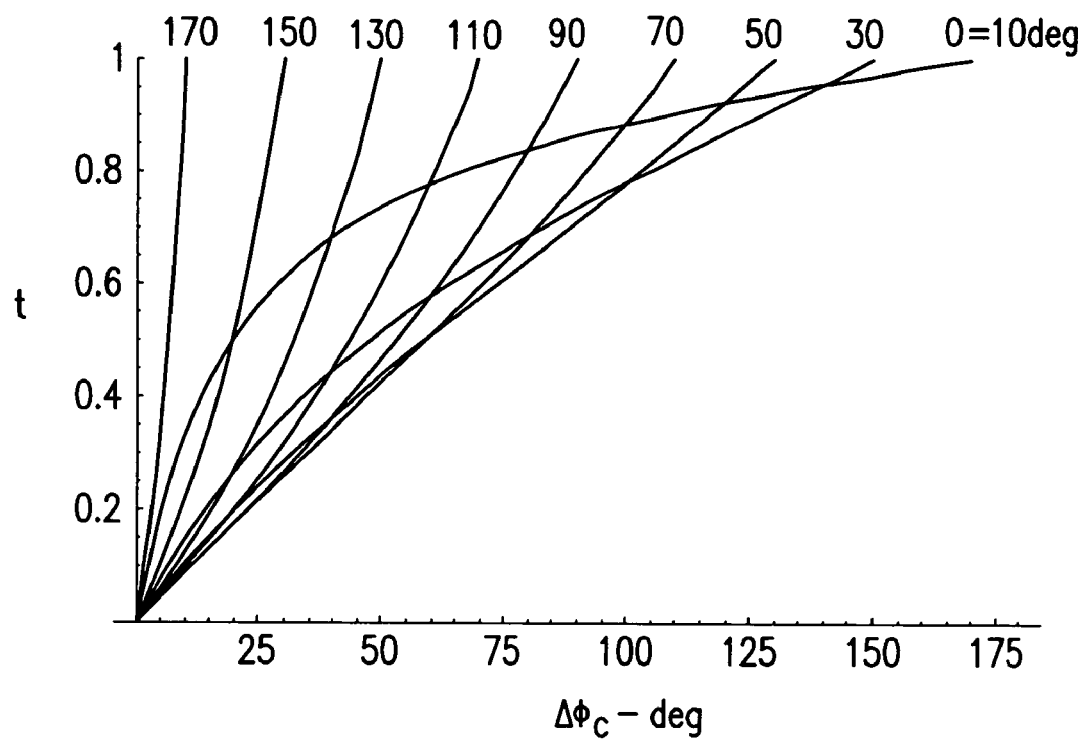
FIG. 3*a* is a plot of ring amplitude transmission t as a function of $\Delta\phi_c$ for the optical resonant modulator of FIG. 2, where s=1 and loop phase θ is a variable.
Figure 3B:
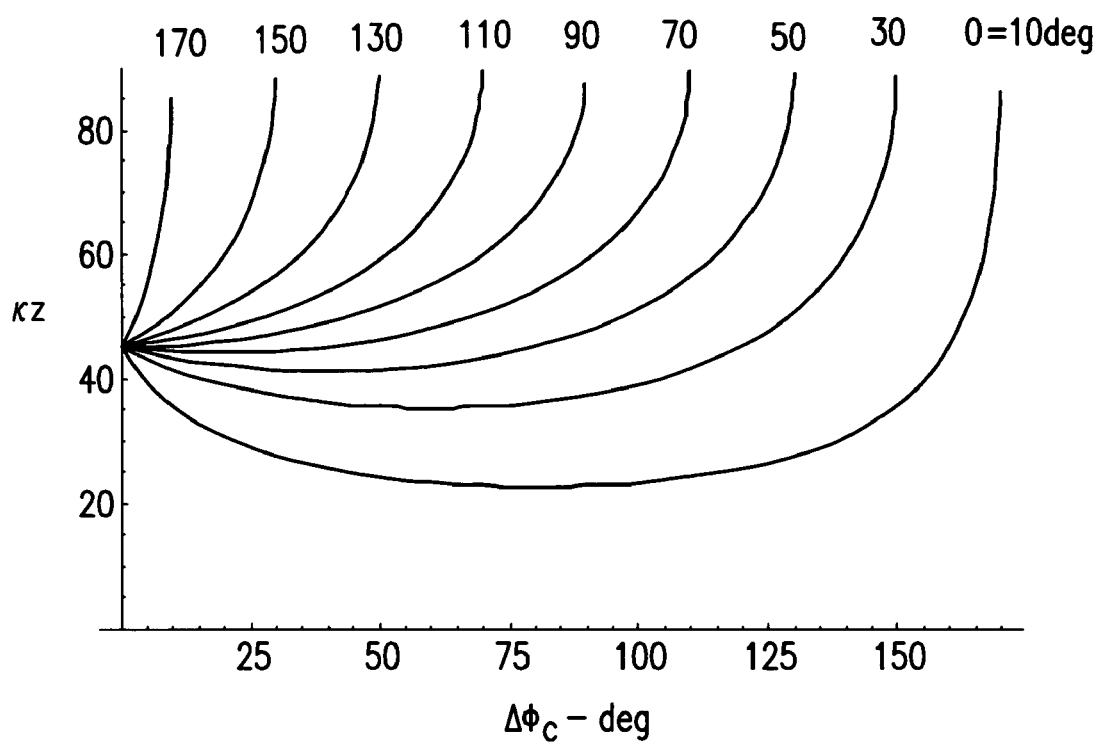
FIG. 3*b* is a plot of coupling angle in degrees, κz, as a function of $\Delta\phi_c$ for the optical resonant modulator of FIG. 2, where s=1 and loop phase θ is a variable.
Figure 4:
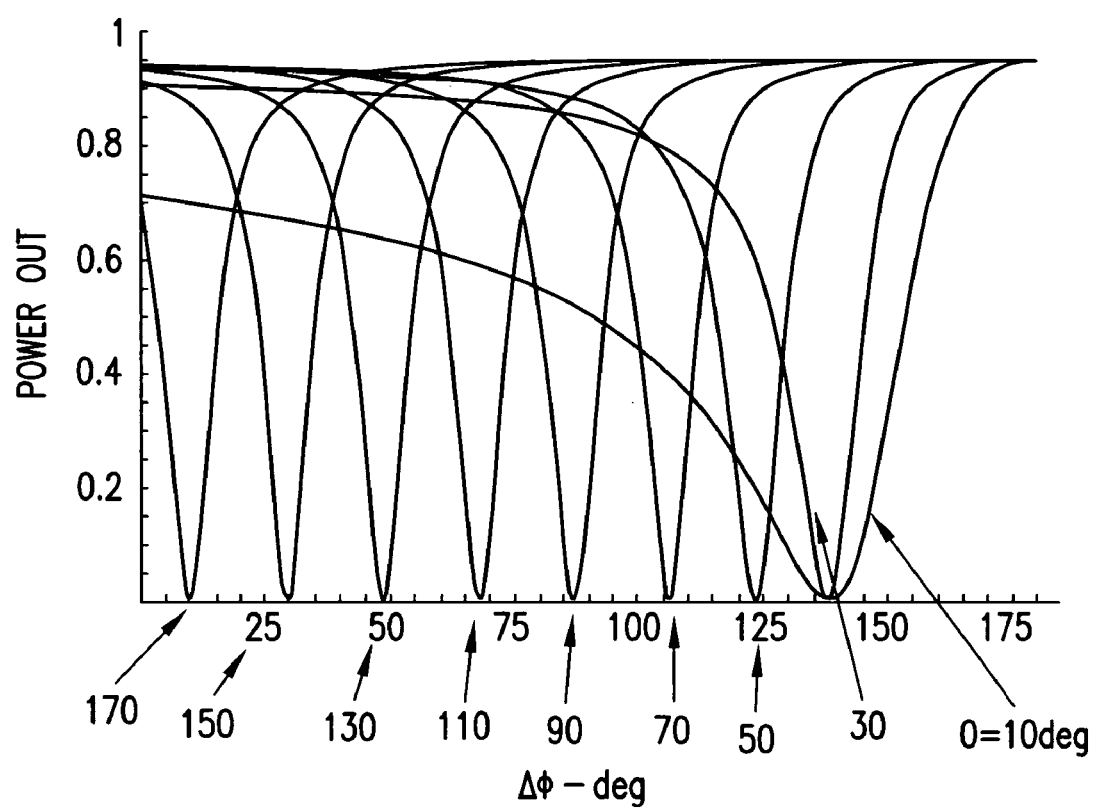
FIG. 4 shows output power characteristics for critically coupled solutions for t=0.95, s=1, optimized κz and θ as variable, 10<θ<170 degrees.

These solutions are plotted, for variable $\theta$, in FIG. 3a which shows t as a function of $\Delta\phi_c$; and in FIG. 3b, which shows $\kappa z$ as a function of $\Delta\phi_c$. In FIG. 4, output characteristics for critically coupled solutions are shown for t=0.95 and variable $\theta$. For the curves of FIG. 4, the value of $\kappa z$ is individually optimized, for each value of $\theta$, to provide $P_{out}=0$, i.e., critical coupling.

Figure 5A:
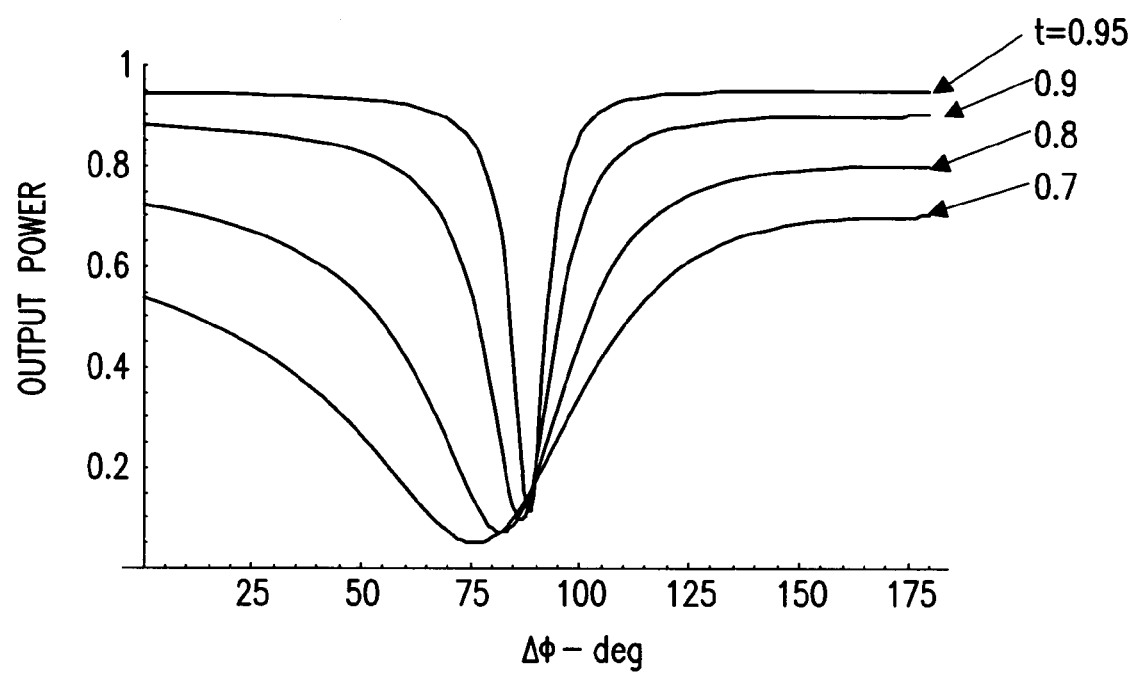
FIG. 5*a* is a plot of output power vs. ring amplitude transmission (t) for the optical resonant modulator shown in FIG. 2, with s=1, θ=90 degrees and optimized κz.
Figure 5B:
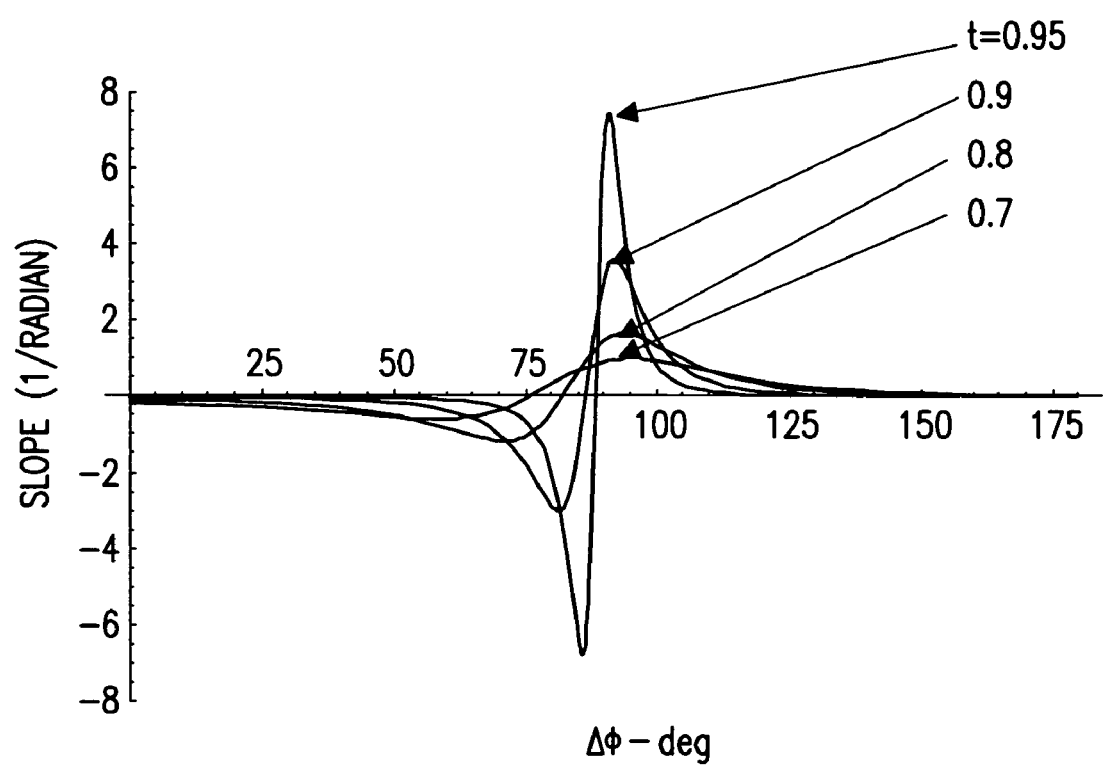
FIG. 5*b* is a plot of the slope of the output power characteristic vs. ring amplitude transmission (t) for the optical resonant modulator shown in FIG. 2, with s=1, θ=90 degrees and optimized κz.

FIG. 5a shows the output characteristics of the resonant modulator shown in FIG. 2, with s=1, P vs. $\Delta\phi$ for $\theta=90$ degrees and with $\kappa z$ optimized to maximize the modulation slope efficiency for several values of t. For these conditions, the peak power output occurs at $\Delta\phi=180$ deg. The corresponding slope (in units of 1/rad for a normalized input power of unity) of the output characteristic is shown in FIG. 5b, which is the important parameter for analog link gain. It is estimated that for the same values of t, the prior art slope values for the prior art device of FIG. 1 are about 30% smaller than those shown in FIG. 5b.

Fabrication

In one embodiment, the optical resonant modulator of FIG. 2 has a monolithic design, being formed on a single substrate material. Suitable materials include known electro-optical materials such as lithium niobate, lithium tantalate, semiconductor materials, a poled polymer, a poled glass, or any combinations thereof.

Either or both, or parts of, ring resonator 110 and optical loop 112 can be fiber or planar waveguide channels, and can be formed by methods known in the art.

Figure 6:
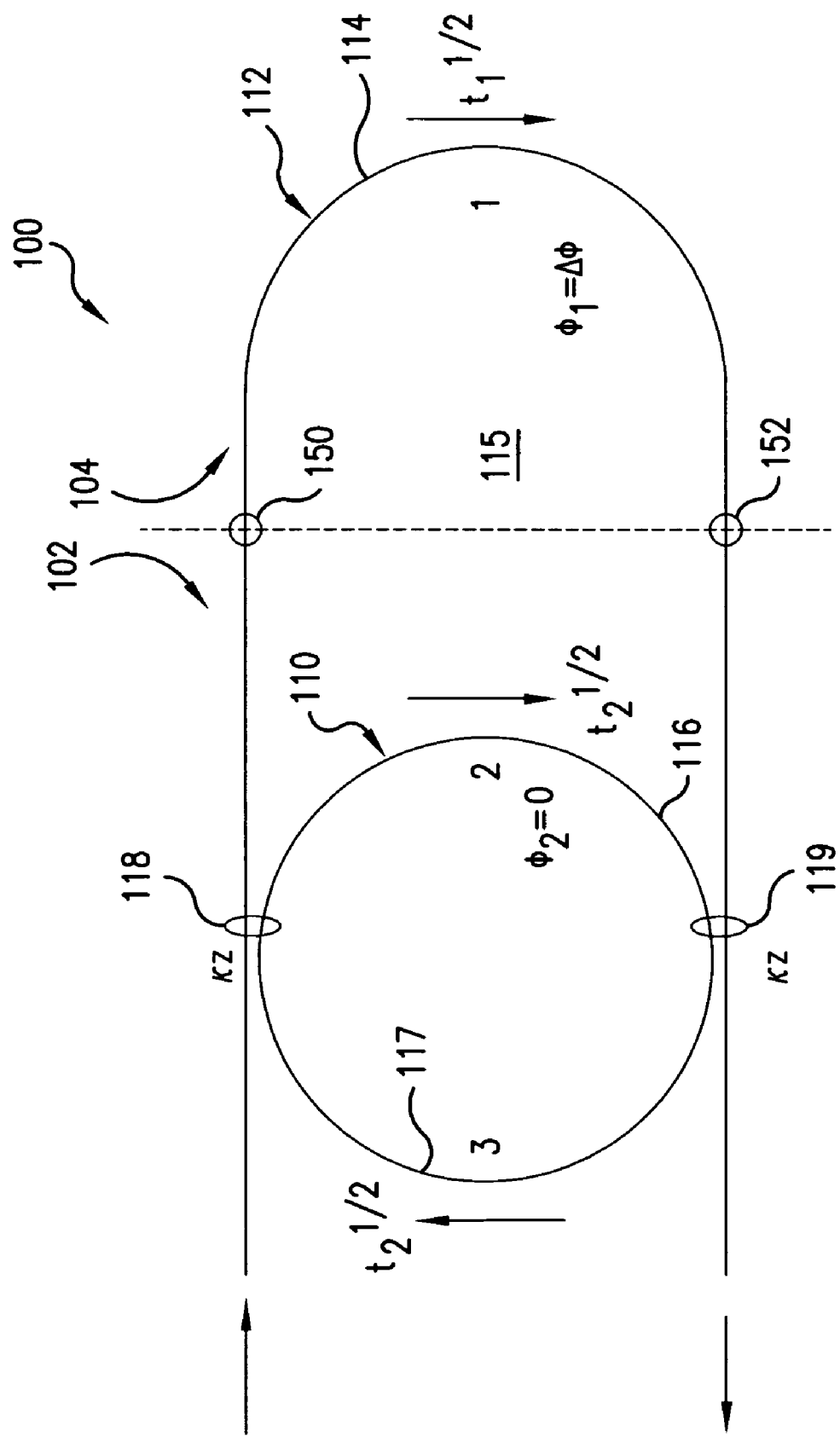
FIG. 6 is a schematic diagram of another embodiment of the optical resonant modulator of the present invention.

Another embodiment of the optical resonant modulator of the invention is shown in FIG. 6. Hybrid optical resonant modulator 100 has electro-optically active section 104, including bend 114 of optical loop 112 and an electro-optically passive section 102 including ring resonator 110.

Electro-optically active section 104 is the phase shift section where the amplitude transmission in path #1 is $t_1^{1/2}$. Examples of materials that can be used to form electro-optically active section 104 include but are not limited to electro-optic ferroelectric materials, such as lithium niobate ($LiNbO_3$), lithium tantalate, semiconductor materials, for instance InP and other suitable phase shift materials. Unfortunately, however, these electro-optic materials are often characterized by relatively high propagation or radiation losses in the curved, or reflection, sections.

Electro-optically passive section 102 is characterized by a ring amplitude transmission $t_2$. The ring amplitude transmission along path #2, specifically along ring segment 116, is $t_2^{1/2}$. Generally, the electro-optically passive section is formed from a material selected to have higher transmission or lower propagation losses than the electro-optically active section 104. Preferred materials include low loss, strongly guiding waveguide systems such as glass, polymers, or semiconductors. Most preferred materials have $t_2$ close to unity ($t_2 \sim 1$). Examples of suitable materials that can be employed to form the electro-optically passive section 102 include but are not limited to low propagation loss doped $SiO_2$ (or glass) waveguides on Si substrates, or doped glass waveguides on glass substrates, or polymer waveguides on Si or glass substrates.

Thus hybrid optical resonant modulator 100 is characterized by an amplitude transmission in electro-optically active section 104, including optical loop 112, that is different and usually lower than the amplitude transmission in ring resonator 110, $t_2$, which preferably is about 1. Or, $t_1 < t_2 \sim 1$.

The waveguides on the two sections, electro-optically passive section 102 and electro-optically active section 104 are joined, in one example, by butt-coupling at waveguide joints 150, 152. In other examples, the passive section 102 and active section 104 are connected by fiber pigtails such as polarization maintaining (pm) fiber pigtails.

However, other techniques known in the art also can be used to form hybrid optical resonator 100, of FIG. 6.

The output characteristics of hybrid optical resonator 100, for the s=1 case, is given by:

$$\frac{P_{out}}{P_{in}} = t_2^2 \frac{(\alpha^2 t_2^2 - 2|a_{11}|\alpha t_2 \cos(\theta - \phi_{11} + \Delta\phi) + |a_{11}|^2)}{(t_2^2|a_{22}|^2 - 2t_2|a_{22}|\cos(\theta + \phi_{22}) + 1)} \quad 4a$$

where α is defined by $$\alpha = \sqrt{\frac{t_1}{t_2}} \quad 4b$$

and critical coupling is again defined by eq. 3a, but now eq. 3b is replaced by $|a_{11}|=\alpha t_2$. For $\alpha=1$, $t_1\sim t_2=t$, and FIGS. 3a, 3b and 4 again define these solutions.

It is estimated that a $SiO_2$/Si or glass ring resonator can have a $t_2$ of about 0.99. If butt coupling losses are taken into account, an electro-optically active section formed on a $LiNbO_3$ substrate is estimated to have a $t_1$ in the range of from about 0.34 to about 0.43. Such a hybrid optical resonator has a value of α in the range of from about 0.59 to about 0.66.

Figure 7A:
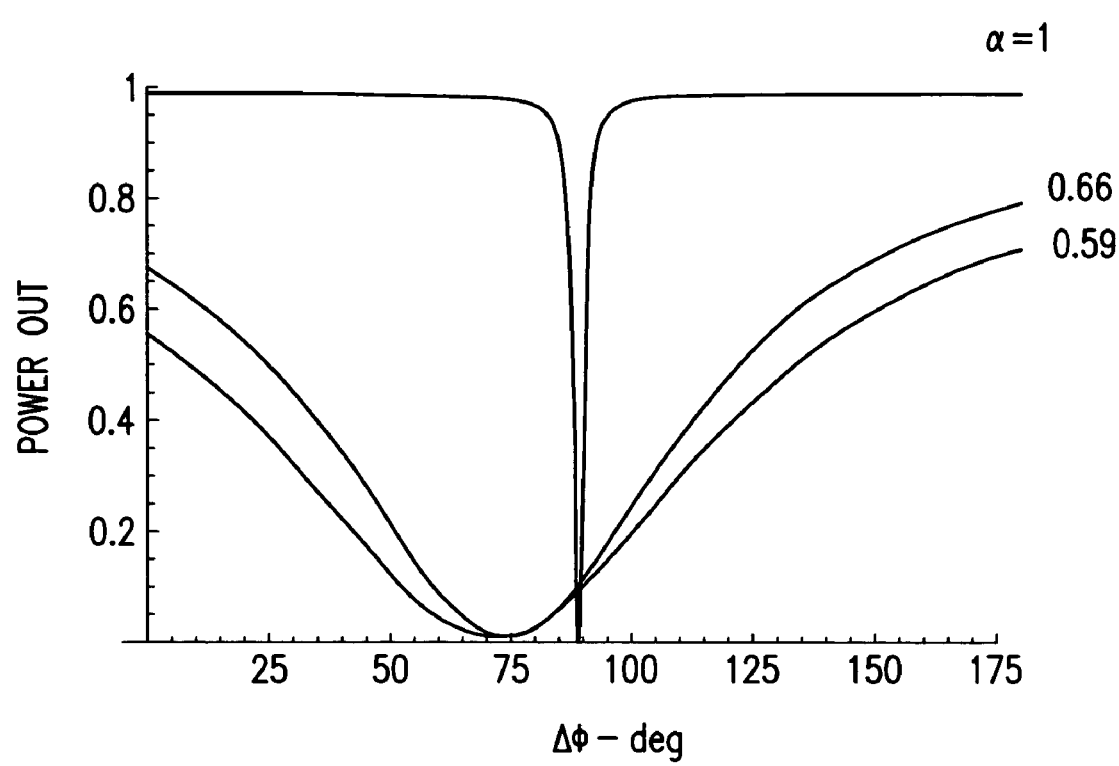
FIG. 7*a* is a plot of output power vs. Δφ, with θ=90 degrees for a SiO$_2$/Si ring (t$_2$=0.99) and LiNbO$_3$ phase shift section (α~0.66; α~0.59), for the optical resonant modulator shown in FIG. 6.
Figure 7B:
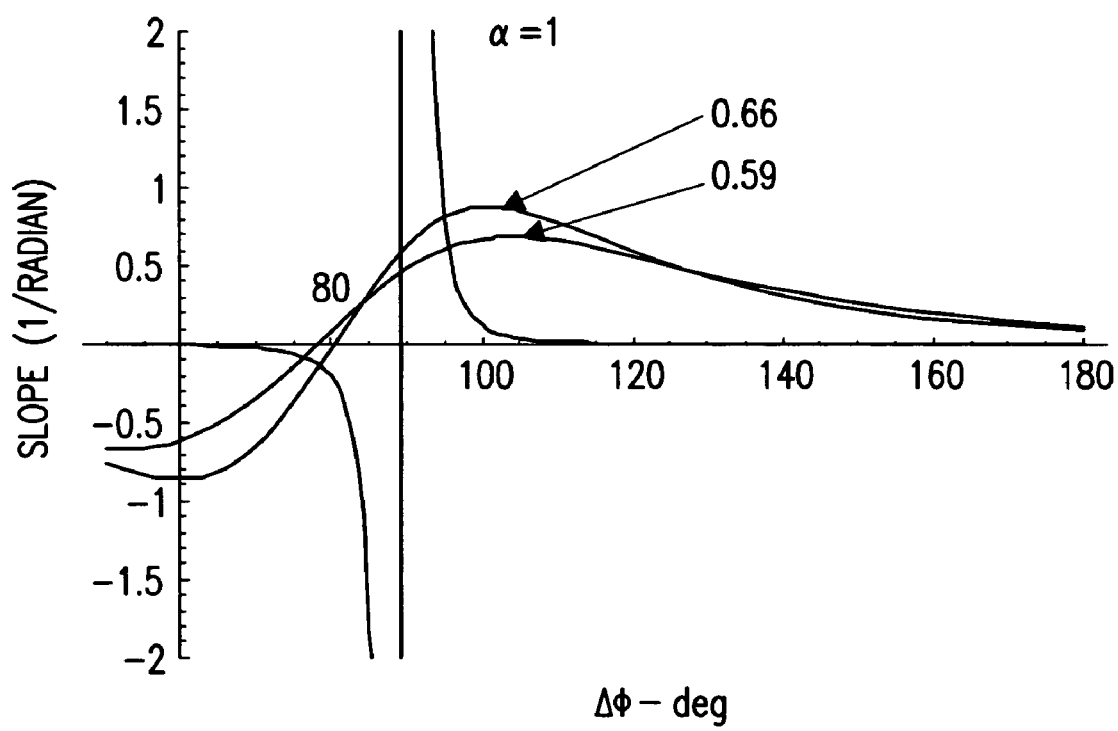
FIG. 7*b* is a plot of the slope of the output power characteristic vs. Δφ, with θ=90 degrees for a SiO$_2$/Si ring (t$_2$=0.99) and LiNbO$_3$ phase shift section (α~0.66; α~0.59), for the optical resonant modulator shown in FIG. 6.

Output characteristics and slopes, as a function of Δφ, with θ=90 degrees, are shown in FIGS. 7a and 7b. For comparison, output power and slope also are plotted for the ideal case where α=1. Thus FIGS. 7a and 7b illustrate that there are advantages (e.g., steeper slope) in increasing the value of α, preferably to a value of a that is close to unity (α~1).

Figure 8:
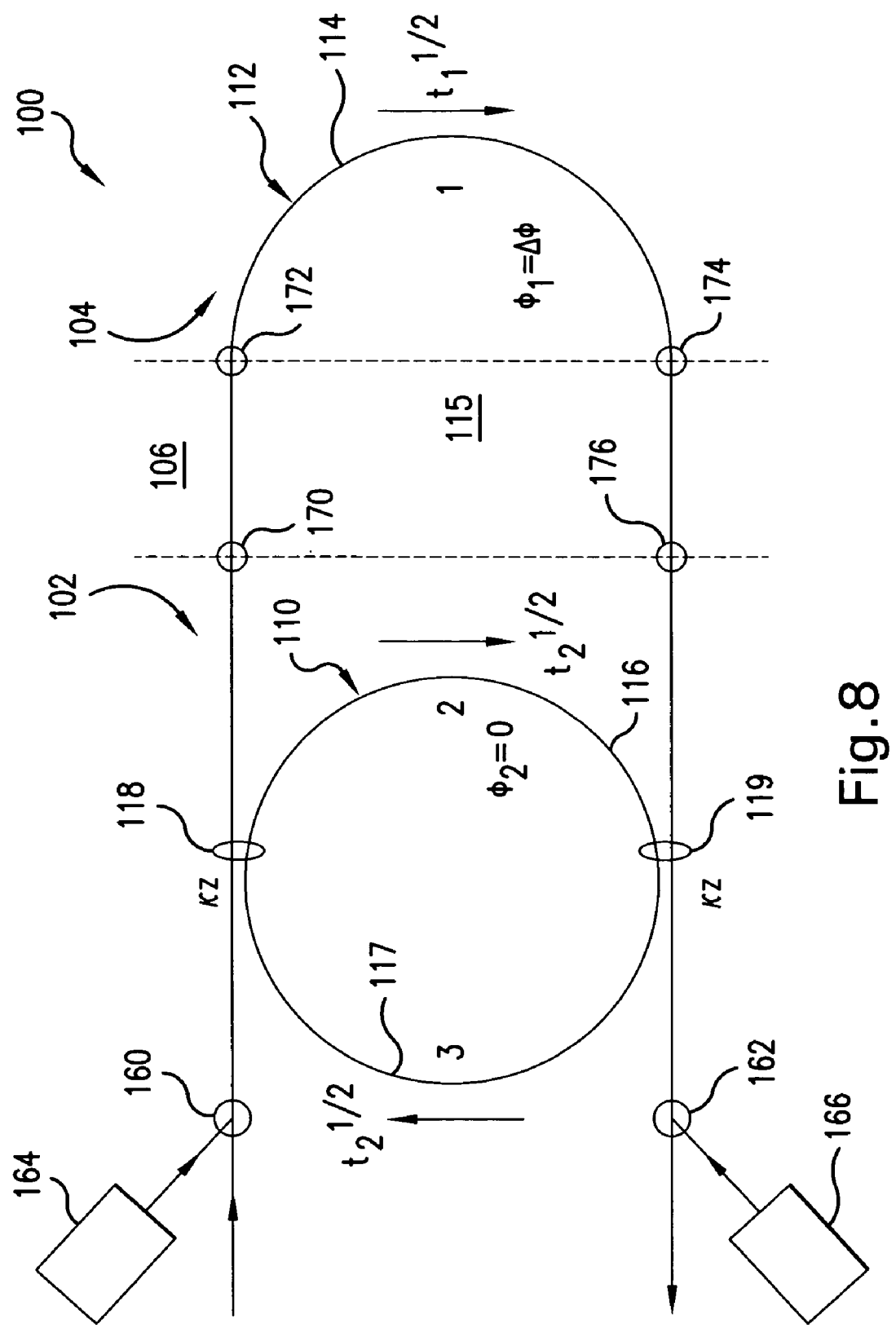
FIG. 8 is a schematic diagram of yet another embodiment of the optical resonant modulator of the invention.

An embodiment of the invention in which α can be maximized is shown in FIG. 8. The illustrated broadband resonant modulator 100 has an electro-optically passive section 102, including ring resonator 110, essentially as described above. Broadband resonator 100 also has electro-optically active section 104, essentially as described above, and including bend 114 of optical loop 112. Ring resonator 110 is coupled to optical loop 112 by directional couplers 118 and 119. Between electro-optically passive section 102 and electro-optically active section 104 is amplification section 106.

Either rare-earth doped planar or fiber waveguides are usually used for amplification section 106. In other examples, semiconductor optical amplifier gain waveguides are used. For fiber connecting sections, the electro-optic phase shift section no longer has to contain a 180 degree direction change, but can be a straight channel waveguide device of similar length.

Broadband resonant modulator 100 can be designed for any optical wavelength of interest, for which amplifiers are available. In a specific example, at the conventional telecom wavelength of 1.55 μm, either the Er or Er/Yb doped glass, with ion exchanged waveguides, or the semiconductor InP system can be selected for amplification. Amplification section 106 can be fabricated from other suitable amplification glasses, semiconductors, doped polymers, or insulators.

Glass or rare-earth-doped amplifiers are pumped, in one implementation, by inserting wavelength selective multiplexers 160 and 162 at the input and/or output of the modulator 100. Pump lasers 164 and 166 are cooled or uncooled diode lasers at 980 or 1480 nanometers (nm), for the Er or Er/Yb systems. Alternatively, the amplifiers may be pumped through integrated multiplexers within the amplifier section 106.

Semiconductor amplifiers are preferably current pumped.

In yet another embodiment, polarization maintaining fiber connect the passive section 102 and the active section 104, with an Er or Er/Yb fiber amplifier inserted in one, or both, of the connecting sections 106.

With a total of 4 butt joints 170, 172, 174, 176, mode mismatch is addressed by a glass system (fiber or channel waveguides) that is mode matched to each adjacent chip with low losses of ½-1 dB/joint, in one example.

In such a case, it is estimated that amplifier gain of <10 dB is sufficient to make $t_1$ close to or equal to $t_2$, where $t_1$ now includes the intrinsic transmission loss and the amplifier gain, and achieve ideal or nearly ideal values of α~1.

Analog link gain for an arbitrary dependence of optical power P on modulator phase Δφ can be expressed as:

$$\text{Gain} = 10 \log_{10}\left[r\frac{\pi}{V_\pi}\left(\frac{dP}{d\Delta\phi}\right)_{\Delta\phi_0}\left(\frac{50R_d}{50+R_d}\right)\left(\frac{2Z_{LN}}{50+Z_{LN}}\right)\right]^2 \quad 5$$

where r is the detector responsivity; $R_d$ the detector output resistance; $Z_{LN}$ is the modulator electrode impedance; $V_\pi$ is the on-off voltage for a non-resonant modulator with the same electrode characteristics assumed for the resonant modulator. In one example, r~0.8; $R_d$~50 Ohms; $Z_{LN}$~40 Ohms and $V_\pi$ is 1.1 volts (V). Excess losses are explicitly contained in the expression of $P_{out}$ in eq. 4a.

For the non-resonant modulator, a conventional MZI assumed to have 3 dB couplers, the slope of the output characteristic with Δφ is:

$$\left(\frac{dP}{d\Delta\phi}\right) = \frac{1}{2}P_{in}t_2\alpha \sin\Delta\phi \quad 6$$

The ratio of the resonant slope to the maximum non-resonant slope at quadrature, where $\Delta\phi_0$=90 degrees, is:

$$\frac{\frac{dP}{d\Delta\phi}}{\frac{1}{2}P_{in}t_2\alpha \sin\Delta\phi_0} \Rightarrow \left|\frac{2}{P_{in}t_2\alpha}\frac{dP}{d\Delta\phi}\right| \quad 7$$

The link gain enhancement due to resonance (resonant gain minus the non-resonant gain) is given by:

$$10 \log_{10}\left[\left|\frac{2}{P_{in}t_2\alpha}\frac{dP}{d\Delta\phi}\right|\right]^2 \quad 8$$

Figure 9A:
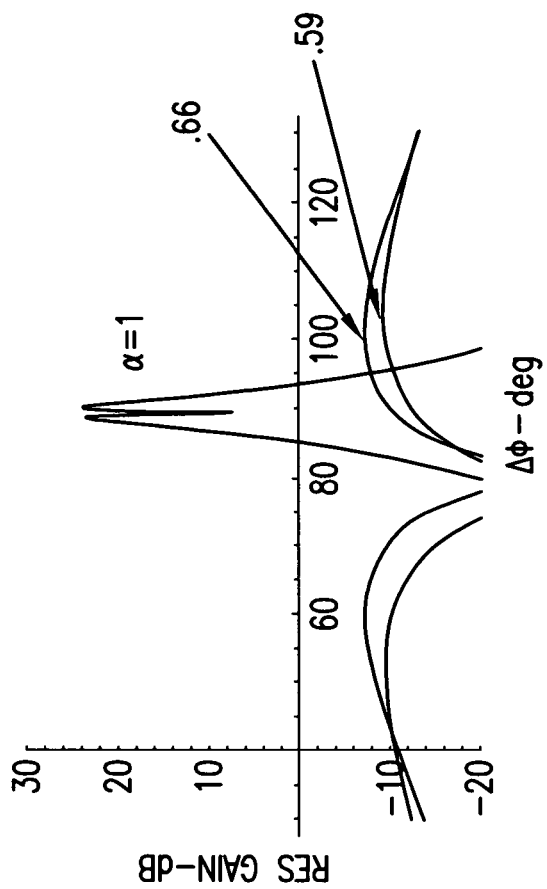
FIG. 9*a* is a plot of relative link gain (resonant gain—non resonant gain) for the optical resonant modulator shown in FIG. 8, with θ=90 degrees; power input of 10 mW; t$_2$=0.99; and α~1.
Figure 9B:
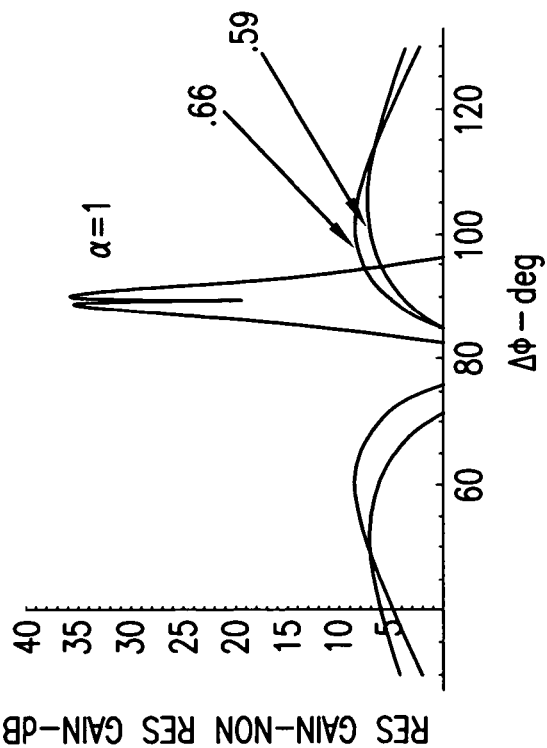
FIG. 9*b* is a plot of absolute link gain for the optical resonant modulator shown in FIG. 8, with θ=90 degrees; power input of 10 mW; t$_2$=0.99; and α~1.

Resonant link gain enhancement and link gain for $P_{in}$=10 mW, $t_2$=0.99, and θ=90 deg, for a broadband resonant modulator such as discussed above, and assuming amplification to achieve α~1, are shown in FIGS. 9a and 9b. Specifically, FIG. 9a shows a plot of resonant gain nonresonant gain (dB) as a function of Δφ (degrees); and FIG. 9b plots the resonant link gain (dB) as a function of Δφ

(degrees). Comparison plots for hybrid modulators having α=0.66 and α=0.59 also are also shown.

The plots indicate that the broadband modulator of the invention shows a potential gain enhancement, compared to the non-resonant case, of about 35 dB. This corresponds to an increase in slope efficiency of a factor of about 50. A comparison with results for the configuration of FIG. 6, show the improved performance of the broadband resonant modulator having an integrated amplifier.

To achieve the same link gain performance in a non-resonant modulator, one would have to decrease $V_\pi$ by the same factor of 50 to about 1.1V/50=0.02V. This is extremely challenging using current technology.

Figure 10:
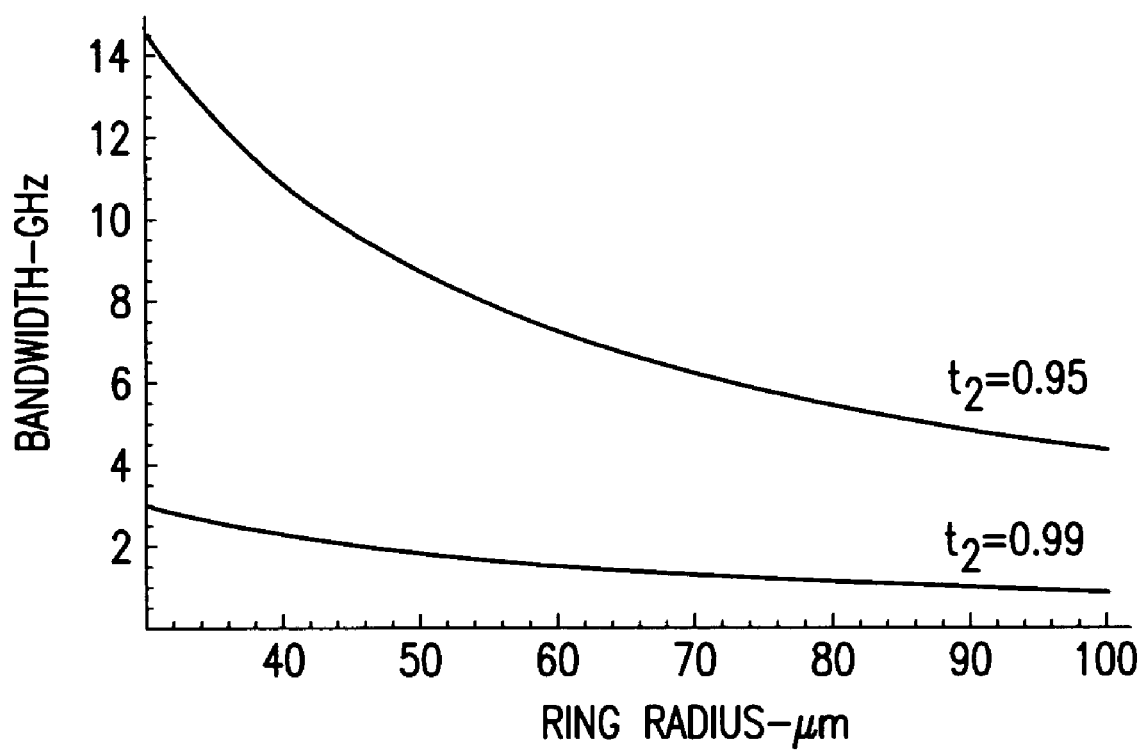
FIG. 10 is a plot of useful modulation bandwidth vs. ring radius, for α=1.

The modulation bandwidth of the modulator is determined by the width (in frequency or wavelength) of the optical resonance either in the ring, or of the output at critical coupling. The modulation frequency must be such that the sidebands of the phase modulated signal at $\omega_0+\omega_m$ and $\omega_0-\omega_m$ stay within the optical resonance, for an optical frequency at $\omega_0$, centered at the peak of the optical resonance, and a modulation frequency $\omega_m$. It can be shown that the maximum power in the ring (ring resonance) coincides with the condition of critical coupling, in that they occur at the same value of loop phase θ, only for the case of FIG. 2 and the case of FIG. 8 with α=1, i.e. for $t_1=t_2$. In this case the width of the resonance (full width at ½ power points) is:

$$\Delta f = \frac{(1-t_2^2)c}{\pi n_{\text{eff}} L} \qquad 9$$

for $t_2 \sim 1$, and the useful modulation frequency is given by the half-width, or ½ of eq. 9. In eq. 9, c is the speed of light, $n_{\text{eff}}$, the effective index of the ring mode, and L the ring circumference. The useful modulation frequency vs. ring radius R and $t_2$ is shown in FIG. 10. For $0.95 < t_2 < 0.99$, and ring radius of 35 μm, the bandwidth should be within 3-13 GHz, with a trade-off between ring transmission $t_2$, which determines link gain, and modulator bandwidth. Larger bandwidths can be achieved with lower values of loop transmission, at the expense of reduced link gain.

Applications

The resonant modulator 100 is usually employed in analog antenna optical communication links, where the information from microwave signals is transmitted over optical fibers, for instance in cellular phone systems, radar communications, and electronic warfare applications, for example.

Figure 11:
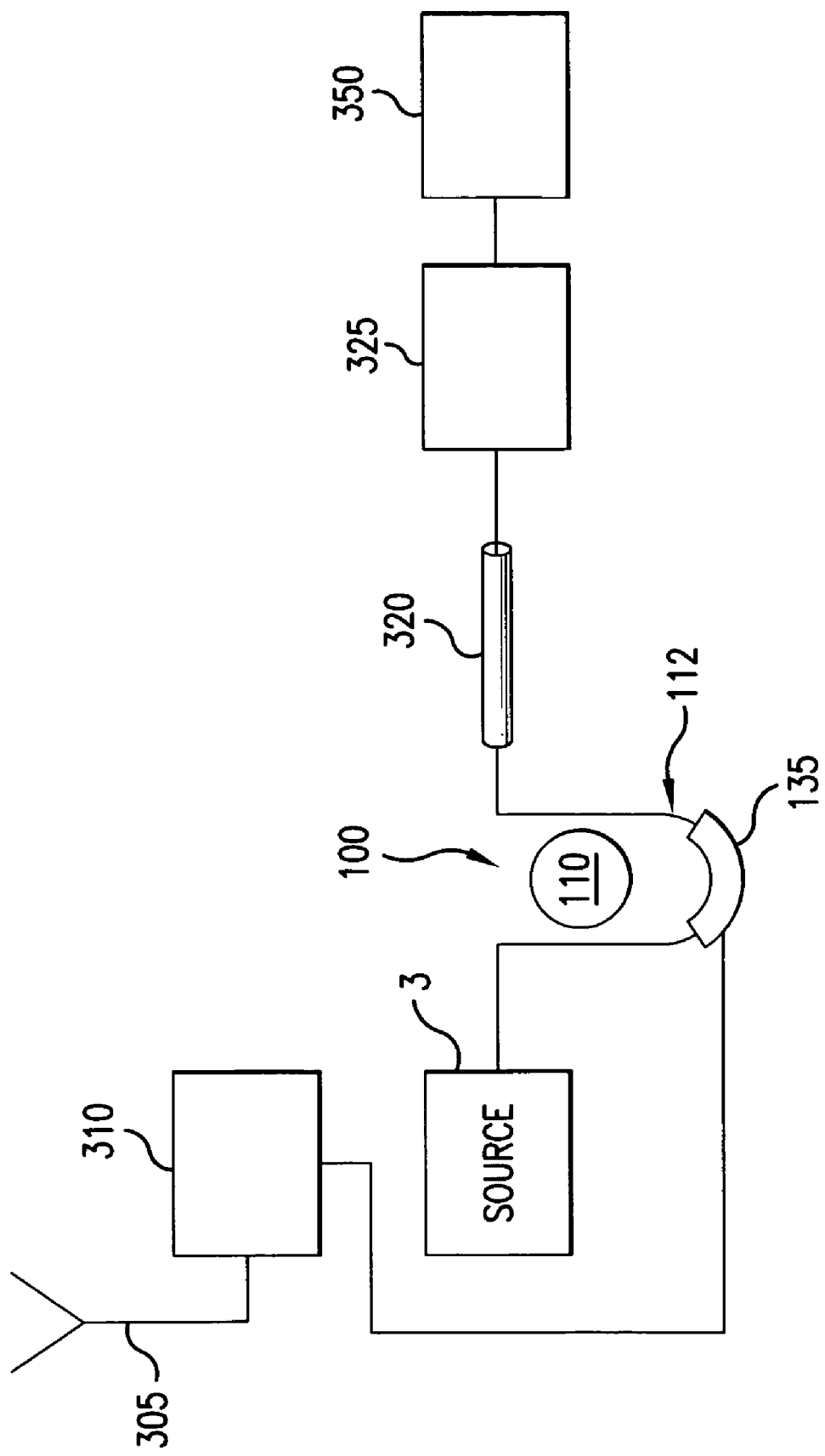
FIG. 11 is a block schematic diagram of a system for a remote antenna optical communication link employing the optical resonant modulator of the invention.

One example is shown in FIG. 11.

The system includes an antenna 305 for receiving a communication that is amplified in amplifier 310. The radio frequency output from amplifier 310 is directed to the inventive modulator 100. In the example, the electrical antenna signal is used to modulate the voltage on loop electrode 135 to thereby modulate the phase delay in the loop 112 relative to the ring resonator 110. Laser 315 provides an optical carrier signal to be modulated by modulator 100, which intensity modulates the optical carrier signal in response to the information bearing radio frequency signal from the antenna 305. The intensity modulated carrier is coupled into optical fiber cable 320 that extends between antenna 305 and control facility. A detector 325 at the end of optical fiber cable 320 detects the intensity modulated optical carrier signal and provides the demodulated radio frequency signal to control facility 350. In other cases the amplifier 310 is omitted and the modulator is driven directly by the signal from the antenna.

The optical resonant modulator of the invention also can be used in digital applications, for on/off switching, routing, transmission, and other optical communications applications. As can be seen in FIGS. 4, 7a, etc., at certain conditions resonant modulator output power is driven from almost unity to almost 0, allowing digital pulse formation with very small control voltages. This capability should be advantageous in digital applications.

While this invention has been particularly shown and described with references to preferred embodiments thereof, it will be understood by those skilled in the art that various changes in form and details may be made therein without departing from the scope of the invention encompassed by the appended claims.

What is claimed is:

1. An optical resonant modulator comprising:
   an input coupler for receiving an input optical signal;
   an output coupler for providing an output optical signal being the input signal modulated in response to a modulating signal from a signal source;
   an optical ring resonator; and
   an optical loop coupled to the ring resonator by the input coupler and the output coupler.

2. The optical resonant modulator of claim 1, wherein the input and output couplers are directional couplers.

3. The optical resonant modulator of claim 1, wherein the optical ring resonator and the optical loop are fabricated in a single chip.

4. The optical resonant modulator of claim 3, wherein the chip includes an electro-optically active material.

5. The optical resonant modulator of claim 1, wherein the signal source is an electrical signal source for inducing a phase shift in optical signals propagated in the optical loop with respect to the optical ring resonator.

6. The optical resonant modulator of claim 1, wherein the signal source is an electrical signal source for modulating a refractive index in the optical loop.

7. The optical resonant modulator of claim 6, wherein the optical ring resonator is formed from an electro-optically passive material.

8. The optical resonator of claim 7, wherein the electro-optically passive material is selected from the group consisting of glass, polymer, semiconductor and any combinations thereof.

9. The optical resonant modulator of claim 8, wherein the electro-optically passive material is Si, $SiO_2$/Si, glass/Si, doped glass/glass, polymer/si polymer/glass or any combinations thereof.

10. The optical resonant modulator of claim 1, further comprising an electro-optically active section on the optical loop.

11. The optical resonant modulator of claim 10, wherein the electro-optically active section is fabricated from lithium niobate, lithium tantalate, a semiconductor material, a poled polymer, a poled glass, or any combinations thereof.

12. The optical resonant modulator of claim 10, wherein the optical ring resonator is formed from electro-optically passive material.

13. The optical resonant modulator of claim 1, further comprising electrodes, being driven in response to the modulating signal, for establishing electric fields in at least one of the optical ring resonator and the optical loop to modulate refractive indices of the optical ring resonator with respect to the optical loop to generate the output optical signal from the input optical signal.

14. An optical resonant modulator comprising:
an optical ring resonator;
an optical loop coupled to the ring resonator by two couplers; and
an amplification section between the optical ring resonator and the optical loop.

15. The optical resonant modulator of claim 14, wherein the amplification section is fabricated from Er or Er/Yb doped glass, ion exchanged waveguides, a semiconductor optical amplifier, or any combinations thereof.

16. The optical resonant modulator of claim 14, further comprising a rare-earth-doped waveguide or fiber at the amplification section and at least one laser pump for the waveguide or fiber.

17. A method for modulating an optical signal comprising:
directing an input optical signal to an optical loop;
diverting at least a portion of the input optical signal to a ring resonator coupled to the optical loop through two couplers, thereby generating an optical loop signal and a ring resonator signal; and
inducing a relative phase change, $\Delta\phi$, between the optical loop signal and the ring resonator signal, in response to an input signal to thereby generate a modulated optical signal.

18. The method of claim 17, wherein each of the two couplers is a directional coupler characterized by a coupling coefficient $\kappa$ and a length z.

19. The method of claim 18, wherein each of the two directional couplers is optimized for the product of $\kappa$ and z.

20. The method of claim 17, wherein the ring resonator is characterized by a ring amplitude transmission.

21. The method of claim 17, wherein an optical length of the optical loop is modulated in response to the input signal.

22. The method of claim 17, wherein, at a phase change of $\Delta\phi_c$, coupling of the ring resonator to the optical loop is essentially critical.

23. The method of claim 22, wherein the optical loop signal has an optical loop amplitude transmission, $t_1^{1/2}$, and the ring resonator signal has a ring amplitude transmission, $t_2$.

24. The method of claim 23, wherein $t_1$ is maximized.

25. The method of claim 23, wherein $t_1$ and $t_2$ are essentially the same.

26. The method of claim 23, wherein $t_2$ is larger than $t_1$.

27. The method of claim 17, further comprising amplifying the optical loop signal.

28. A hybrid optical resonant modulator comprising:
an input coupler for receiving an input optical signal;
an output coupler for providing an output optical signal being the input signal modulated in response to a modulating signal from a signal source;
an electro-optically passive section including a ring resonator; and
an electro-optically active section, including an optical loop, wherein the optical loop is coupled to the ring resonator through the input coupler and the output coupler.

29. A hybrid optical resonant modulator comprising:
an electro-optically passive section including a ring resonator; and
an electro-optically active section, including an optical loop, wherein the optical loop is coupled to the ring resonator through two couplers, and wherein the electro-optically passive section is fabricated from a material having a higher amplitude transmission for an optical signal than the electro-optically active section.

30. The hybrid optical resonator of claim 28, further comprising a drive electrode for changing the refractive index of the electro-optically active section in response to the modulating signal.

31. The hybrid optical resonant modulator of claim 28, further comprising an amplification section between the electro-optically passive and electro-optically active sections.

32. The hybrid optical resonant modulator of claim 31, further comprising at least one pump laser for the amplification section.

33. A broadband resonant modulator comprising:
an electro-optically passive section including a ring resonator;
an electro-optically active section, including an optical loop, wherein the optical loop is coupled to the ring resonator through two couplers; and
an amplification section between the electro-optically passive and electro-optically active sections.

34. A resonant modulator comprising:
an open loop having a signal input and a signal output;
a closed loop resonator coupled to the open loop through two couplers; and
a source for supplying an input signal to control a relative phase shift between the open loop and the closed loop resonator.

35. The resonant modulator of claim 34, wherein the two couplers are directional optical couplers.

36. The resonant modulator of claim 34, wherein the open loop and the closed loop resonator are fabricated in a single chip.

37. The resonant modulator of claim 36, wherein the chip includes an electro-optically active material.

38. The resonant modulator of claim 34, wherein the source modulates a refractive index in the open loop.

39. The resonant modulator of claim 38, wherein the optical ring resonator is formed from an electro-optically passive material.

40. The resonant modulator of claim 34, further comprising electrodes, being driven in response to the source, for establishing electric fields in at least one of the open loop and the closed resonator to modulate refractive indices of the open loop with respect to the closed resonator to generate an output optical signal on the signal output from an input optical signal received on the signal input.

* * * * *